BEST AVAILABLE COPY

2. Sheets. Sheet. 1

G. M. Leslie,

Boiling Soap.

Reissue No. 4107.
(Original 44,142.)

Reissued Aug. 23. 1870.

Witnesses,

Chas. H. Smith
Geo. T. Pinckney

Geo. M. Leslie
Jesse Oakley
Lemuel W. Serrell atty

H. PETERS, PHOTO-LITHOGRAPHER, WASHINGTON, D. C.

8

EXAMINER.

2. Sheets. Sheet. 2.

G. M. Leslie,

Boiling Soap.

No. 4,107. Reissued Aug. 23. 1870.

Witnesses,

Chas. H. Smith

Geo. T. Sinclair

Geo. M. Leslie

Jesse Oakley

Lemuel W. Serrell

Atty.

N. PETERS, PHOTO-LITHOGRAPHER, WASHINGTON, D. C.

UNITED STATES PATENT OFFICE.

GEORGE M. LESLIE, OF NORTHUMBERLAND, PENNSYLVANIA, ASSIGNOR TO HIMSELF AND JESSE OAKLEY, OF NEW YORK, N. Y.

IMPROVEMENT IN APPARATUS FOR CRUTCHING SOAP.

Specification forming part of Letters Patent No. 44,142, dated September 6, 1864; Reissue No. 4,107, dated August 23, 1870.

*To all whom it may concern:*

Be it known that I, G. M. LESLIE, now of Northumberland, in the county of Northumberland and State of Pennsylvania, have invented a new and Improved Apparatus for Crutching Soap; and the following is hereby declared to be a full and correct description of the said invention.

The object of this invention is to effect the operation of crutching soap automatically, so as to expose all portions of the soap to the crutching operation with uniformity.

A kettle or vessel is provided for holding the soap, and the crutches are operated by mechanism to carry them into and through the contents of the kettle while the latter is being revolved, so as to present the soap to the action of the crutches.

Figure 1:
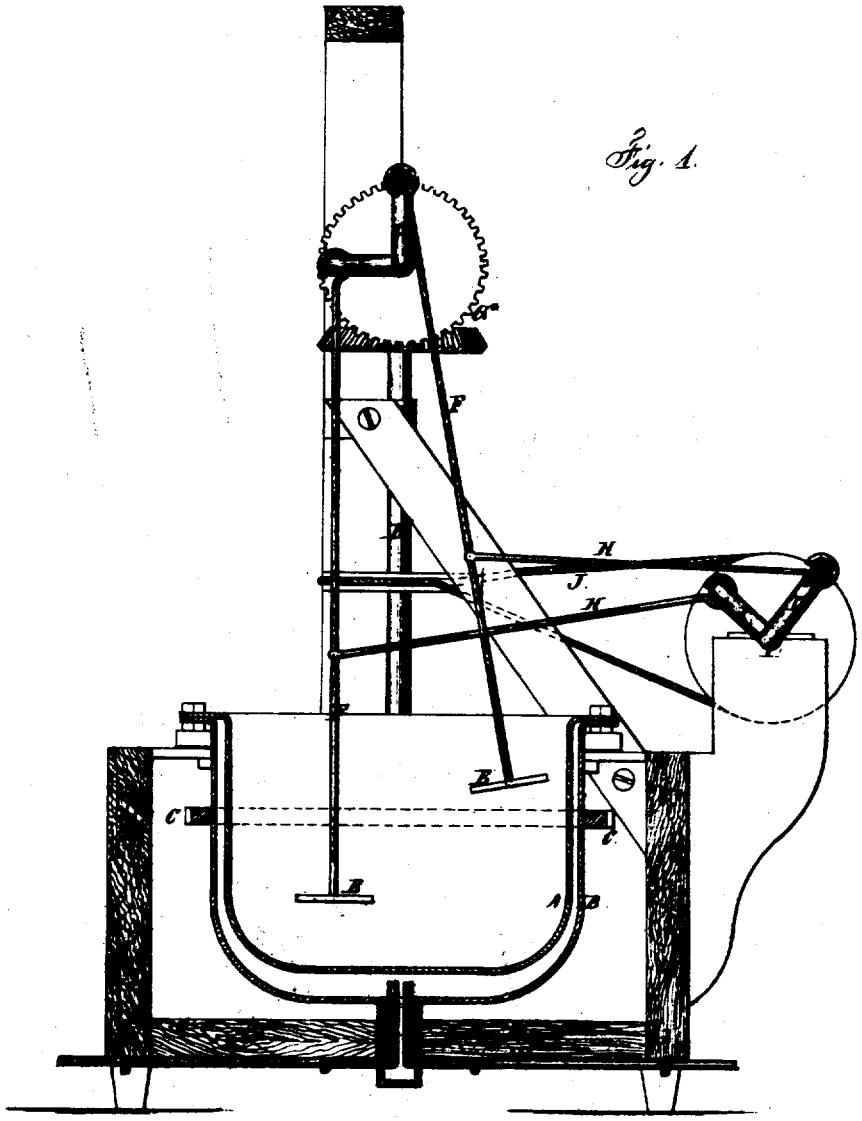
Figure 2:
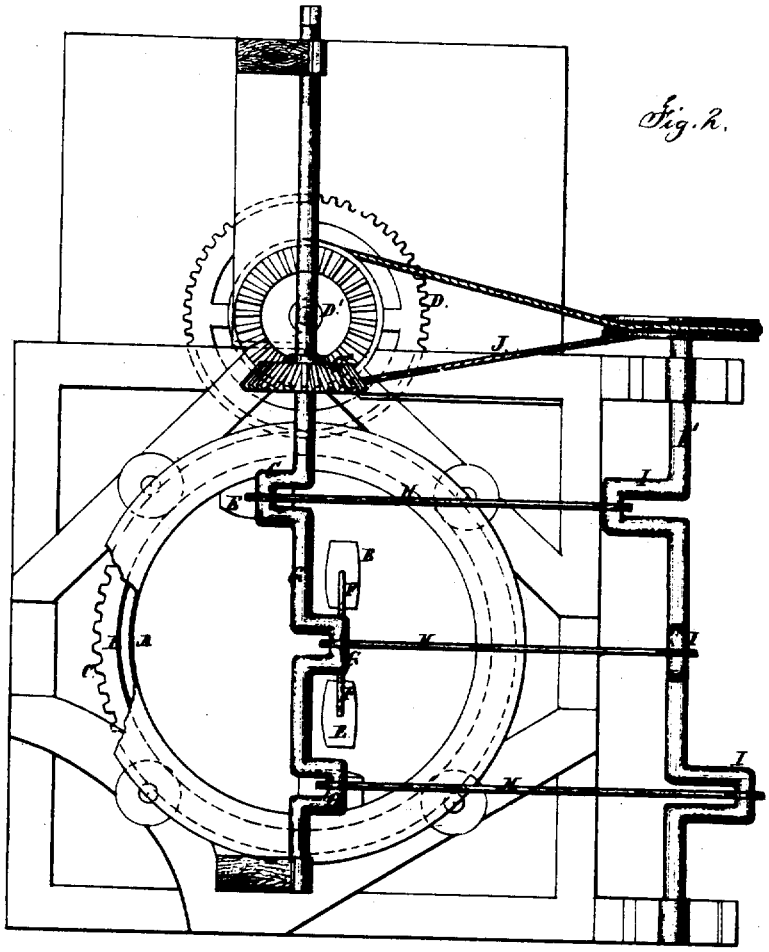

In the annexed drawings, Figure 1 is a vertical section centrally of this crutching apparatus, and Fig. 2 is a plan of the same with some of the parts in section.

The kettle A is of any desired size or character adapted to receive the soap to be crutched. The steam-jacket B may be provided for heating the soap or maintaining the desired temperature.

Around the kettle or vessel A a toothed rim, C, is provided, that is acted upon by a wheel, D, on the vertical shaft D′, which is revolved by competent power.

The crutches or stirrers E F are operated automatically. The handles F are represented as extending to the cranks G on the shaft G′, so that the crutches receive from said cranks a vertical movement, and at the same time the connecting-rods H and cranks I give a horizontal or swinging motion to the said crutches.

The shafts G′ I′ receive a revolving motion from a suitable prime mover. The gear-wheels G* and belt J are represented as connecting said shafts G′ and I′ with the shaft D′.

From the foregoing it will be understood that the crutches receive a compound motion, and rise and fall as well as swing horizontally, so that they pass into and through the soap in the kettle A, and this kettle or vessel revolving presents all portions of the soap to the stirring and crutching operation, so that hand labor is dispensed with, and a larger quantity of soap can be crutched than heretofore by the hand method.

It is obvious that different mechanical means from those shown might be employed to impart motion to the crutches or stirrers. Therefore this invention is not confined to the mechanism represented.

What I claim as my invention is—

1. A kettle or vessel to contain soap, mounted so as to be revolved, in combination with crutches or stirrers to operate automatically on the soap as presented to the stirrers by the revolution of the kettle, substantially as set forth.

2. The crutches E F, operated by cranks, so as to receive a rising, falling, and swinging movement, in combination with the kettle or vessel A, substantially as set forth.

Dated this 14th day of July, A. D. 1870.

GEORGE M. LESLIE.

Witnesses:

W. C. KAPP,

GEO. R. PINCKNEY.